Figure 1:
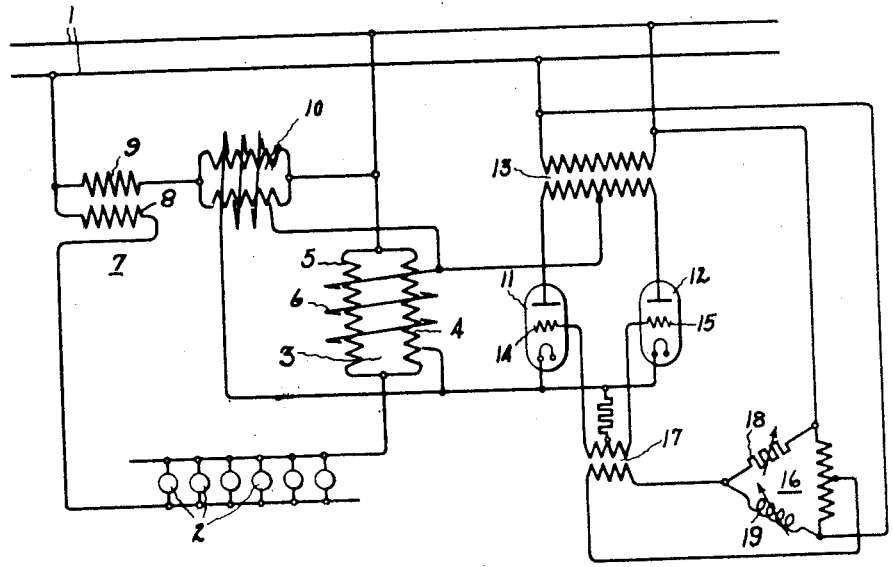

Jan. 1, 1935.　　　　　　B. A. CASE　　　　　1,986,622

REGULATION COMPENSATING ARRANGEMENT

Filed Nov. 3, 1931

Inventor:
Byron A. Case,
by Charles E. Tullar
His Attorney.

Patented Jan. 1, 1935

1,986,622

UNITED STATES PATENT OFFICE 1,986,622

REGULATION COMPENSATING ARRANGEMENT

Byron A. Case, Fort Wayne, Ind., assignor to General Electric Company, a corporation of New York Application November 3, 1931, Serial No. 572,832

11 Claims. (Cl. 175—312)

My invention relates to compensating arrangements and particularly to arrangements for compensating for the voltage regulation in a saturable reactor which is used as a control element in an alternating current circuit.

My invention is applicable to any regulating or control arrangement in which a series-connected variable impedance device, having a minimum impedance greater than zero, is used to control the current or voltage of a translating device or devices. An example of such an arrangement is a stage lighting circuit in which the illumination of the lights is controlled by means of a series-connected saturable reactor. The use of saturable reactors in this connection is becoming more and more widespread because of their lower losses as compared with variable resistance rheostatic devices and because they do not depend upon contacts for changing the connections of the main circuit. However, saturable reactors have the disadvantage in comparison with resistance type controllers that when the reactors are fully saturated their minimum reactance is still appreciable and consequently there is a certain unavoidable voltage drop, or what is technically known as voltage regulation, in them. This means that full circuit voltage and consequently greatest illumination cannot be obtained when saturable reactors are used. By special design and expensive construction the minimum reactance of saturable reactors may be so reduced that their regulation amounts to only about two or three percent. However, the expense of such special design and construction will often outweigh the advantages of a reactor in comparison with rheostatic controllers.

In accordance with my invention I provide means for compensating for the voltage regulation in saturable reactors. It is thus possible to use saturable reactors which are of ordinary design and which may be inexpensively constructed. At first thought it might seem that the simplest way of compensating for the voltage regulation in a saturable reactor would be to insert a constant voltage in the controlled circuit which is substantially equal to the voltage drop in the saturable reactor when it is fully saturated. However, such an arrangement does not really produce compensation at all because the control range of the reactor will be no greater than it was before, due to the fact that the compensating voltage which has been inserted in the circuit will act to neutralize part of the effect of the reactor when it is unsaturated, that is to say, when it has its maximum reactance. Accordingly, I provide compensating means which produces a variable voltage in the controlled or regulated circuit which varies inversely with the reactance of the reactor and which is substantially equal to the voltage drop in the reactor when the latter is fully saturated.

Such an arrangement will be relatively inexpensive, as its kv-a. rating need only be about 10% of the kv-a. rating of the controlled circuit due to the fact that even the most inexpensive saturable reactors have a regulation of not more than about 10%, that is to say, the voltage drop in them when they are fully saturated is not more than about 10% of the voltage applied to the circuit.

Such variable voltage compensating means may take a variety of forms, and in the following specification I have disclosed three forms of such means in which the variable compensating voltage is produced by means of a booster transformer.

An object of my invention is to provide compensating means for the voltage regulation in variable impedance type series-connected circuit controllers.

Another object of my invention is to provide compensating means for the voltage regulation in saturable reactors.

My invention will be better understood from the following description taken in connection with the accompanying drawing and its scope will be pointed out in the appended claims.

Figure 2:
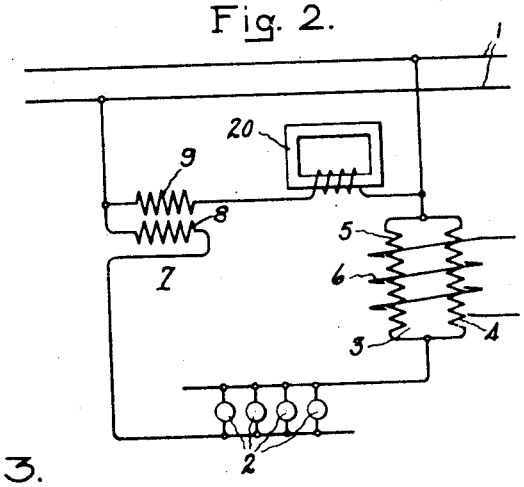
Figure 3:
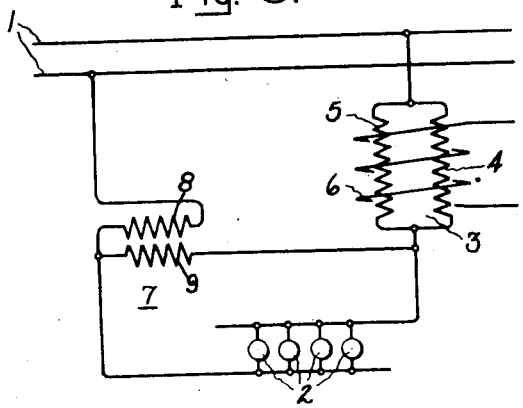

In the drawing, in which similar reference characters designate similar elements throughout the several figures, Fig. 1 is a diagrammatic showing of an illumination control system embodying one form of my invention in which the voltage boost of the compensating booster transformer is controlled by means of a direct-current saturated reactor; Fig. 2 illustrates a modification in which the voltage boost of the booster transformer is controlled by means of a negative volt-ampere characteristic device; and Fig. 3 illustrates a modification in which the voltage boost of the booster transformer is controlled by the voltage of the load.

Referring now to Fig. 1 of the accompanying drawing, 1 is an alternating current supply circuit for supplying energy to a translating device or devices, such, for example, as a plurality of electric lamps 2. In order to control the illumination of lamps 2, a saturable reactor 3 has its alternating current winding connected in series in the lamp circuit. Reactor 3 is of well known design comprising a pair of parallel connected alternating current windings 4 and 5 and a common direct-current saturating winding 6. This construction has a number of advantages, the more important of which are that when the alternating-current windings 4 and 5 are oppositely wound with respect to each other, or if they are similarly wound and if their instantaneous fluxes are opposite, no alternating-current voltage will be induced in the direct-current saturating winding and also no harmonics will be produced in the alternating-current winding by the direct-current saturation.

The operation of such a reactor for controlling the current or voltage of a circuit is well known to those skilled in the art. Briefly, it depends upon the fact that as the magnetic saturation of the core of the reactor changes the reactance of its alternating-current winding to the alternating current also changes in such a manner that when the core of the reactor is fully saturated, that is, when its direct-current saturating winding is energized to its greatest extent the reactance of the reactor is a minimum and is almost that of an air core reactor, while when the reactor's core is unsaturated and the direct-current saturating winding is deenergized the reactance of the reactor is high, being now the reactance of a simple iron core reactor. Thus, variations in the energization of the direct-current saturating winding 6 cause similar variations in the current in the lamps 2, so that when the direct-current winding is deenergized the current in lamps 2 will be a minimum and consequently their illumination will be a minimum, whereas as the current in the saturating winding 6 is increased, the current and consequently the illumination of lamps 2 will also be increased up to a maximum value at which the reactor is fully saturated. Instead of viewing the operation of the reactor with respect to the lamp current, it may also be considered as controlling the voltage across the lamps. Thus, as the reactance of reactor 3 changes the ratio of the voltage drop across the lamps to the voltage drop across the reactor changes so that when the reactor is fully saturated maximum voltage occurs across the lamps, whereas when the reactor is substantially unsaturated, minimum voltage occurs across the lamps. In a typical installation, and assuming that the voltage of supply circuit 1 is 120 volts, it is possible with an ordinary reactor to vary the voltage of the lamps from approximately 110, when the reactor is fully saturated, to approximately 5 volts when the reactor is unsaturated. The difference between 110 and 120 volts represents the voltage regulation in the reactor 3.

In order to compensate for the regulation in reactor 3, I provide a booster transformer 7 having a series voltage boosting winding 8 connected in the lamp circuit and a shunt winding 9 connected across this circuit. Any suitable means may be employed for controlling the voltage boost of transformer 7, and as illustrated, I have provided a small saturable reactor 10 which is preferably similar in design to the main saturable reactor 3. By varying the saturation of reactor 10 its reactance may be controlled and consequently the voltage applied to the shunt or primary winding 9 of the booster transformer may be controlled in the same way as the voltage across lamps 2 is controlled by main reactor 3. In this manner the voltage boost induced in the secondary or series winding 8 may be controlled. The direct-current saturation of reactor 10 may be controlled in any suitable manner and as illustrated I connect its direct-current saturating winding in parallel with the saturating winding 6 of the main reactor 3, although, of course, they might be connected in series if desired. In this manner, when saturable reactor 3 is fully saturated, that is to say, when its reactance is a minimum, the reactance of reactor 10 will also be a minimum and consequently the voltage boost produced by booster transformer 7 will be a maximum. By suitable design this voltage may be made to compensate for the voltage drop in reactor 3 so that full voltage may be applied to lamps 2 at the time that the main reactor is fully saturated. As the saturation of reactor 3 decreases, that is to say, when it is desired to dim the lamps 2, the saturation of reactor 10 will also decrease and consequently the voltage boost of transformer 7 will decrease so that when the direct-current excitation of both reactors is reduced to a minimum the reactance of reactor 3 will be a maximum and the voltage boost produced by transformer 7 will be a minimum, so that minimum voltage will be applied to lamps 2.

Any one of a number of well known arrangements may be employed for controlling the direct current excitation of the reactors 3 and 10. One well known arrangement of this type which has been found to give good results is a controlled rectifier of the vapor electric discharge type. An advantage of using a rectifier is that a separate source of direct current is not required. The rectifier consists of a pair of unidirectional conducting vapor electric discharge valves 11 and 12 connected to a transformer 13 and to the direct-current windings of reactors 3 and 10 in such a manner that alternate half cycles of the alternating current supplied through transformer 13 from the main circuit 1 will flow through valves 11 and 12 respectively so that full wave rectified current is supplied to the direct-current windings which are in the common return circuit of both valves. Rectifier valves 11 and 12 are provided with control electrodes or grids 14 and 15 respectively, and these valves have the property of changing from a non-conducting to a conducting state only upon the simultaneous occurrence of a positive anode potential with respect to the cathode potential and a potential of the control elecrode which is above the cathode potential by a critical amount, and of thereafter remaining conducting regardless of the potential of the control electrode so long as the anode potential is positive with respect to the cathode potential. It will thus be seen that a convenient way of controlling the output of a rectifier including such valves is to energize the control electrodes by an alternating potential which may be varied in phase with respect to the anode potential of the valve. Thus, if the control electrodes are rendered positive as soon as the anodes of the valves become positive, current will be passed by the valves during complete half cycles respectively, while if the control electrodes are not rendered positive until later in the positive half cycles of anode potential of each valve the current passed by the valves will be reduced and consequently the output of the rectifier will be reduced. This is a well known way of controlling the output of a rectifier of this type. A convenient and well known way of so controlling the control electrode potentials is by energizing them from the main alternating-current circuit through a suitable phase-changing circuit. One such circuit is a well known type of impedance phase-shifting circuit 16 consisting essentially of relatively variable resistance and reactance elements 18 and 19 respectively. By connecting the control electrodes through a grid transformer 17 to the phase-shifting circuit 16, it is possible by varying the relative ohmic values of the resistance and reactance elements 18 and 19 thereof, to vary the phase relation of the anode potential with respect to the control electrode potential.

The operation of the arrangement illustrated in Fig. 1 will now be clear to those skilled in the art. Thus, by varying the phase of the grid potentials of the valves by means of the phase-shifting circuit 16 the saturation of reactors 3 and 10 may be controlled in a manner to control the voltage and illumination of lamps 2 from substantially the voltage of circuit 1 to a minimum of almost zero value.

In Fig. 2 is illustrated a modification in which the saturable reactor 10 is replaced by the negative volt-ampere characteristic device 20. This device may take any one of a number of well known forms and as illustrated, it is an inherently self-saturating reactor.

The operation of the arrangement illustrated in Fig. 2 is such that as the lamp current increases due to a decrease in the reactance of reactor 3, the current in the reactor 20 will increase due to the fact that the current in shunt winding 9 must increase in proportion to the increase in current in series winding 8 of booster transformer 7, because of the inductive relation of these windings. The increase in current in self-saturating reactor 20 decreases the ratio of its reactance to the reactance of shunt winding 9 and as the voltage drops across shunt winding 9 and reactor 20 vary in proportion to the reactances of these elements, the voltage of shunt winding 9 will increase and consequently the voltage boost of transformer 7 will increase. By suitable design the voltage of transformer 7 may be made substantially equal to the voltage drop in reactor 3 when this reactor is fully saturated, while when this reactor is unsaturated substantially all of the voltage of the circuit 1 will be across reactor 20 and almost no voltage will be across shunt winding 9 with the result that under these conditions the minimum voltage boost is produced by transformer 7.

In Fig. 3 is shown a modification in which the voltage applied to the shunt or primary winding 9 of booster transformer 7 is controlled by variations in the voltage drop across the main saturable reactor 3 instead of by means of auxiliary devices as in Figs. 1 and 2. This may be done by connecting the primary winding 9 of the booster transformer to respond to the difference between the supply circuit voltage and the voltage drop in the main reactor 3, or by connecting the primary winding 9 directly across the lamps 2, as shown in Fig. 3. The difference is merely whether the series winding 8 is below the shunt winding 9, as in Figs. 1 and 2, or whether it is above it, as in Fig. 3.

The operation of the arrangement illustrated in Fig. 3 is as follows: When reactor 3 is fully saturated its reactance is a minimum and consequently the voltage drop across it will be a minimum. As the voltage across the lamps 2 is consequently a maximum at this time, the voltage of winding 9 will also be a maximum at this time and consequently the voltage boost produced by the series winding 8 of the booster transformer will be a maximum. By suitable design this voltage boost may be made to compensate for the voltage drop in the reactor 3 so that full circuit voltage may be applied to lamps 2 at this time. When the reactor 3 is not saturated, that is to say, when it is desired to have the lamps dimmed as much as possible, the voltage applied to the shunt winding of the booster transformer will obviously be a minimum because most of the circuit voltage will be taken up in the voltage drop in the saturable reactor 3. Consequently at this time, the voltage boost produced by the booster transformer will be a minimum, which is what is desired. During intermediate values of saturation of the main reactor 3 the voltage boost produced by the booster transformer 7 will also have intermediate values.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, an alternating-current circuit, a variable impedance device having a minimum impedance greater than zero connected in said circuit, and variable voltage means for compensating said circuit for the voltage regulation in said device.

2. In combination, an alternating-current circuit, a variable impedance device connected in said circuit to control the current flow therein, and means for inserting a voltage in said circuit which varies substantially inversely with the impedance of said device.

3. In combination, an alternating-current circuit, a saturable reactor connected therein, and variable voltage means for compensating said circuit for the voltage regulation in said reactor.

4. In combination, an alternating-current circuit, a saturable reactor connected therein, means for varying the reactance of said reactor, and means for inserting a voltage in said circuit which varies inversely with the reactance of said reactor.

5. In combination, an alternating-current circuit, a saturable reactor connected therein, a booster transformer having a series winding connected in said circuit and a shunt winding connected across said circuit, and means for varying the voltage boost of said transformer substantially directly with changes in the current in said circuit which are produced by variations in the reactance of said saturable reactor.

6. In combination, an alternating-current circuit, a saturable reactor connected therein, a booster transformer having a series winding in said circuit and a shunt winding connected across said circuit, a saturable reactor connected in series with said shunt winding, direct-current saturating windings on said reactors, and means for simultaneously controlling the energization of said direct-current saturating windings.

7. In combination, an alternating-current circuit, a saturable reactor connected therein, a booster transformer having a series winding connected in said circuit and a shunt winding connected across said circuit, and a device having a negative volt-ampere characteristic connected in series relation with said shunt winding.

8. In combination, an alternating-current circuit, a saturable reactor connected therein, a direct-current saturating winding on said reactor, a booster transformer having a series winding connected in said circuit and a shunt winding connected across said circuit, a self-saturating reactor connected in series with said shunt winding, and means for controlling the energization of said direct-current saturating winding.

9. In combination, an alternating current circuit, a saturable core reactor having a variable reactance alternating current winding connected in said circuit, a direct current control winding for said reactor, means for controlling the energization of said control winding, a booster transformer having a voltage boosting secondary winding connected in said circuit, a primary winding for said transformer, and connecting means for energizing said primary winding from said circuit with a voltage which varies substantially inversely with the voltage drop across the alternating current winding of said reactor.

10. An illumination control system comprising, in combination, an alternating current supply circuit, a plurality of electric lamps connected therein, a saturable core reactor having an alternating current winding connected in said circuit, a direct current control winding for said reactor, means for varying the energization of said control winding so as to vary the voltage applied to said lamps, a booster transformer having a secondary winding connected in series with said lamps, a primary winding on said booster transformer, and connecting means for energizing the primary winding of said booster transformer from said circuit with a variable voltage which is substantially proportional to the voltage applied to said lamps.

11. A compensated electric lamp dimming system comprising, in combination, a source of alternating current, a plurality of electric lamps connected thereto, a saturable core reactor having an alternating current winding connected in series with said lamps, a direct current control winding for said reactor, means for varying the energization of said control winding whereby the saturation of said reactor and consequently the voltage applied to said lamps is controlled, a booster transformer having a voltage boosting winding connected in series with said lamps, a primary winding for said transformer, and means connecting said primary winding to be energized from the circuit which includes said lamps with a variable voltage which is a maximum when the saturation of said reactor and the voltage across said lamps are a maximum and which is a minimum when the saturation of said reactor and the voltage across said lamps is a minimum.

BYRON A. CASE.